(12) United States Patent
Schwenck et al.

(10) Patent No.: US 8,998,543 B2
(45) Date of Patent: Apr. 7, 2015

(54) BLANK AND TOOL WITH COOLING CHANNELS

(75) Inventors: Manfred Schwenck, Albstadt (DE); Armin Helbig, Albstadt (DE)

(73) Assignee: Guehring OHG, Albstadt (DE)

( * ) Notice: Subject to any disclaimer, the term of this patent is extended or adjusted under 35 U.S.C. 154(b) by 32 days.

(21) Appl. No.: 13/289,318

(22) Filed: Nov. 4, 2011

(65) Prior Publication Data

US 2012/0114438 A1    May 10, 2012

Related U.S. Application Data

(63) Continuation of application No. PCT/DE2010/001116, filed on Sep. 22, 2010.

(30) Foreign Application Priority Data

Sep. 22, 2009  (DE) .................. 10 2009 042 440
Jul. 12, 2010   (EP) ..................... 10007163

(51) Int. Cl.

| B23B 51/06 | (2006.01) |
|---|---|
| B23B 27/10 | (2006.01) |
| B23P 15/32 | (2006.01) |
| B21C 23/14 | (2006.01) |
| B23G 5/00  | (2006.01) |

(52) U.S. Cl.
CPC ............... *B23P 15/32* (2013.01); *B21C 23/147* (2013.01); *B23B 51/06* (2013.01); *B23G 5/005* (2013.01)

(58) Field of Classification Search
CPC ........ B23B 51/06; B21C 23/147; B23P 15/32
USPC ................ 408/56–59, 230; 76/108.6; 407/11; 72/260, 264
IPC ............................................... B23B 27/10,51/06
See application file for complete search history.

(56) References Cited

U.S. PATENT DOCUMENTS

| 2,541,849 A | * | 2/1951 | Villeneuve ................... 76/108.6 |
| 3,096,668 A | * | 7/1963 | Maynard ......................... 408/59 |
| 3,555,935 A | * | 1/1971 | Dorrenberg ................. 76/108.6 |
| 5,601,857 A | * | 2/1997 | Friedrichs ..................... 425/381 |
| 5,634,747 A | * | 6/1997 | Tukala et al. .................. 408/59 |
| 5,676,499 A | * | 10/1997 | Tukala ............................ 408/59 |
| 5,780,063 A | * | 7/1998 | Friedrichs .................. 425/131.1 |

(Continued)

FOREIGN PATENT DOCUMENTS

| CH | 665 979 | 6/1988 |
| DE | 10 2006 032 005 | 1/2008 |

(Continued)

*Primary Examiner* — Eric A Gates
(74) *Attorney, Agent, or Firm* — Burr & Brown, PLLC

(57) ABSTRACT

The application comprises a blank for producing a cutting tool with at least one inner bore for conducting fluids, wherein the blank comprises at least a first and a second portion along its longitudinal axis, wherein the inner bore in the first portion is formed substantially in a straight line and parallel to the longitudinal axis of the blank, and the inner bore in the second portion has a first twist with a first twist angle greater than zero, wherein the blank can be obtained by a continuous pressing operation, in particular a continuous extruding operation. The application also describes an extrusion device for producing a blank, wherein the extrusion device comprises a control element for controlling the twist angle, in particular the first and/or second twist angle.

16 Claims, 5 Drawing Sheets

(56) References Cited

U.S. PATENT DOCUMENTS

| | | | |
|---|---|---|---|
| 5,904,939 A * | 5/1999 | Friedrichs | 425/381 |
| 6,582,167 B1 * | 6/2003 | Sugata et al. | 409/136 |
| 6,926,478 B2 * | 8/2005 | Sugata et al. | 409/136 |
| 7,048,481 B2 * | 5/2006 | Sugata et al. | 409/136 |
| 7,296,497 B2 * | 11/2007 | Kugelberg et al. | 76/108.6 |
| 7,997,836 B2 * | 8/2011 | Kim et al. | 408/59 |
| 2005/0031423 A1 | 2/2005 | Kugelberg et al. | |
| 2005/0047951 A1 | 3/2005 | Gronquist et al. | |
| 2005/0214082 A1 * | 9/2005 | Dasch | 408/59 |
| 2006/0027046 A1 | 2/2006 | Kugelberg et al. | |
| 2008/0152444 A1 | 6/2008 | Kugelberg et al. | |
| 2010/0150673 A1 * | 6/2010 | Schneider et al. | 408/59 |
| 2010/0247255 A1 * | 9/2010 | Nitzsche et al. | 408/59 |
| 2010/0272531 A1 * | 10/2010 | Shavit | 408/59 |
| 2011/0268518 A1 * | 11/2011 | Sampath et al. | 408/59 |
| 2012/0288337 A1 * | 11/2012 | Sampath | 408/57 |
| 2012/0308319 A1 * | 12/2012 | Sampath et al. | 408/59 |
| 2013/0136550 A1 * | 5/2013 | Kakai et al. | 408/59 |
| 2013/0302101 A1 * | 11/2013 | Scanlon et al. | 408/59 |

FOREIGN PATENT DOCUMENTS

| | | |
|---|---|---|
| EP | 0118035 B1 * | 1/1987 |
| EP | 1 502 721 | 2/2005 |
| EP | 1 593 442 | 11/2005 |
| JP | 01020952 A * | 1/1989 |

* cited by examiner

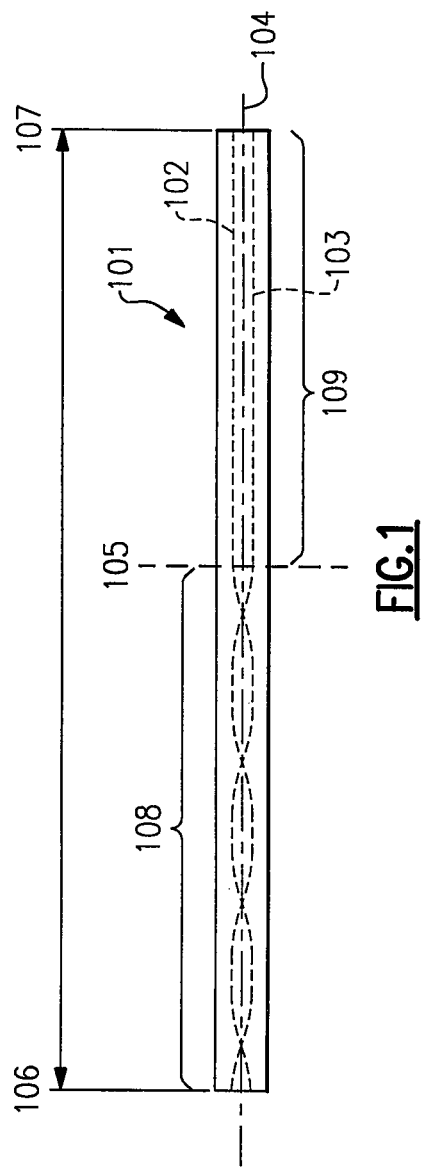
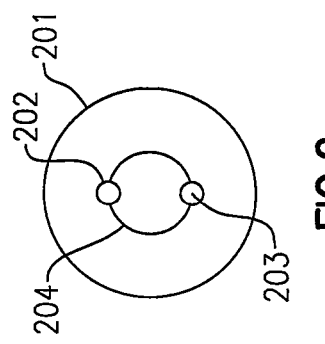
FIG.1
FIG.2

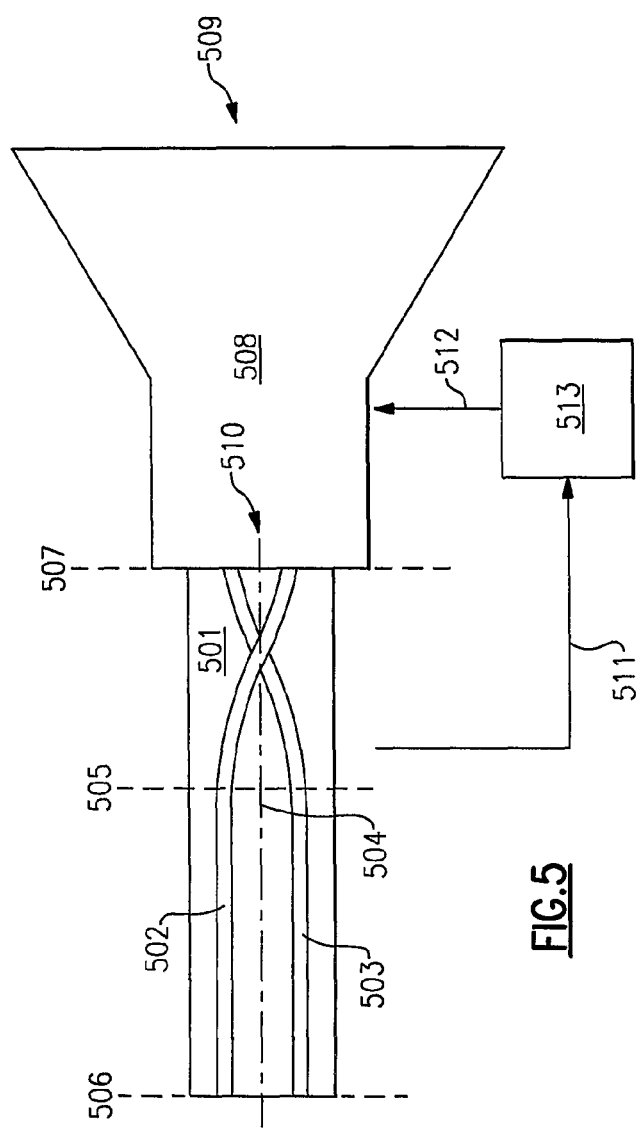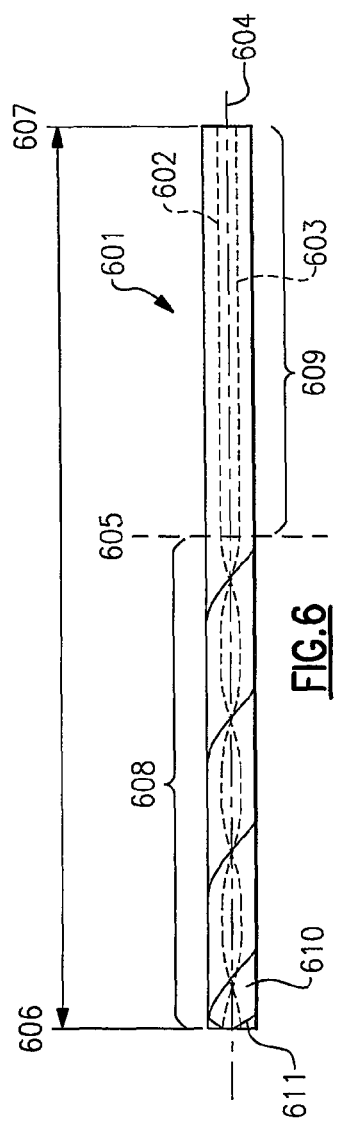

BLANK AND TOOL WITH COOLING CHANNELS

FIELD OF THE INVENTION

The present invention relates to a blank for producing a cutting tool. Moreover, the present invention relates'to an extrusion device and a method for producing this blank. The present invention further relates to a tool with cooling channels and a tool for the machining of a workpiece.

BACKGROUND TO THE INVENTION

It is prior art to produce hard metal blanks by means of an extrusion method, wherein the blanks are provided with inner bores during the pressing operation. The inner bores serve as channels for conveying coolant and/or lubricant to the cutting part of the tool. The inner bores of a blank can be formed helically, wherein the inner bores and the flutes of the finished tool also formed helically have to be formed so as to match one another.

SUMMARY OF THE INVENTION

The helically formed inner bores lead to a higher flow resistance for the coolant and/or lubricant to be conveyed in the inner bores. For this reason, the quantity of coolant and/or lubricant that can be fed per unit of time to the cutting zone of the cutting tool proves to be less compared to rectilinearly run inner bores. This leads to shorter service lives and/or to lower cutting speeds on account of poorer cooling and/or poorer removal of the chips.

It can therefore be regarded as a problem of the present invention to make available blanks with inner bores that enable longer service lives and higher cutting speeds of the cutting tool.

This problem is solved in the independent claims. Further advantageous embodiments of the invention emerge from the dependent claims.

As a first embodiment of the invention, a blank for producing a cutting tool with at least one inner bore for conducting fluids is made available, wherein the blank comprises at least a first and a second portion along its longitudinal axis, wherein the inner bore in the first portion is formed substantially rectilinear and parallel to the longitudinal axis of the blank, and the inner bore in the second portion has a first twist with a first twist angle greater than zero, wherein the blank can be obtained by a continuous pressing operation, in particular a continuous extruding operation. The fluid can be coolant, lubricant, drilling water, cooling lubricant and/or an oil/air mixture, with which minimum quantity lubrication is enabled.

The blank, also referred to as a preform, arises through an extruding operation. During the pressing operation, the blank is provided here with inner bores, also referred to as cooling channels, inner channels or simply channels. According to the invention, these inner bores run in a first region rectilinearly and parallel to the longitudinal axis of the blank. Substantially rectilinear and parallel to the longitudinal axis of the blank is understood here to mean that, due to manufacturing tolerances, the inner bores may also run partially non-rectilinearly and/or not parallel to the longitudinal axis of the blank. In a further portion or region of the blank, the inner bores have a twist. Overall, therefore, a blank is present which comprises one (or more) rectilinear inner bore(s) in a first portion and wherein, moreover, the same inner bore (the same inner bores) is (are) formed helically or spirally in a further portion.

The portion with the rectilinearly run inner bore can be used as a shank for the cutting tool, whilst the portion with the helically formed inner bore is suitable as the cutting part of the tool. The overall region in which a helical formation of the inner bore is present can thus be reduced, as a result of which the flow resistance for the fluid conveyed in the inner bore is reduced. A greater quantity of the fluid capable of being conveyed in the inner bore results from this, so that a longer service life and/or higher cutting speed of the cutting tool results. The first twist angle can for example have a value in the range from 10 to 60 degrees.

As a second embodiment of the invention, an extrusion device for producing a blank according to any one of claims 1 to 15 is made available, wherein the extrusion device comprises a control element for controlling the twist angle, in particular the first and/or second twist angle.

The extrusion device is used to press out the blank, the blank being provided with inner bores during the pressing-out. The aim with the production of blanks is to produce blanks with reproducibly identical geometries of the inner bores. Furthermore, the portion of the blank with the helically formed inner bore should be as short as possible in order to keep the flow resistance as low as possible. On the other hand, the portion with the rectilinearly run inner bore must not project into the working, cutting part of the tool, because otherwise there is the risk of the inner bore being interrupted or of the walls of the cutting part of the tool turning out to be too thin, which can drastically shortened the service lives. An exact control is therefore required in order to ensure that rectilinearly run inner bores are present only in the region of the shank. This is ensured by the control element according to the invention.

As a third embodiment of the invention, a method for producing a blank according to any one of claims. 1 to 5 is made available, comprising the steps of pressing, in particular extruding, a first portion of the blank, in which the inner bore is formed substantially rectilinear and parallel to the longitudinal axis of the blank, and pressing, in particular extruding, a second portion of the blank, in which the inner bore is formed with a first twist and a first twist angle with a value greater than zero.

In accordance with the method according to the invention, two portions are formed inside a blank. These two portions differ by the different formation of the inner bore. In a first portion, the inner bore runs substantially rectilinear. In a further, second portion, the same inner bore experiences a twist with a twist angle. The twist angle is greater than zero and can for example have a value from the range from 10 degrees to 60 degrees.

As a fourth embodiment of the invention, a tool is made available for the machining of a workpiece, wherein the tool comprises a flute and a clamping shank, wherein the tool comprises a first region with a first spiral angle of the flute and a second region with a second spiral angle of the flute, wherein the first spiral angle is formed differently from the second spiral angle and/or wherein a third region is disposed between the first region and the second region, wherein in the third region the spiral angle of the flute in the boundary region to the first region is the same as the first spiral angle and in the boundary region to the second region is the same as the second spiral angle.

A blank is made available according to an exemplary embodiment of the invention, wherein the blank comprises a third portion along the longitudinal axis of the blank, wherein the third portion is disposed between the first portion and the second portion, wherein in the third portion the inner bore adjacent to the first portion does not have a twist, and adjacent to the second portion has a second twist with a second twist angle, wherein the second twist angle and the first twist angle are the same. An arbitrary, but in particular a constant continuous transition between the first portion and the second portion is thus enabled.

A blank is made available according to a further example of embodiment of the invention, wherein in the third portion the inner bore comprises a twist with a twist angle which continuously changes along the longitudinal axis of the blank.

A blank is made available, which comprises in an intermediate region an inner bore with a twist and a twist angle, the value whereof continuously changes. A gradual transition between two regions with difference twist angles can thus be created, as a result of which the flow resistance of the inner bore can be further reduced.

A blank is made available in a further embodiment according to the invention, wherein the first portion comprises roughly half of the blank. It is thus possible to produce a cutting tool which in the first place, despite the long shank, has a very low flow resistance of the fluid in the inner bore, since the inner bores are formed rectilinear in the shank, and on the other hand offers a large contact area for the clamping chuck, as a result of which a particularly good guidance of the cutting tool and therefore a good transfer of force from the clamping chuck to the cutting tool is enabled.

A blank is made available according to an exemplary embodiment of the invention, wherein the first twist angle has a value between 10 and 45 degrees, in particular 15, 20, 30 or 40 degrees.

A blank is made available according to a further example of embodiment of the present invention, wherein the blank comprises two or three inner bores. By making available further additional inner bores, the quantity of coolant and/or lubricant that is conveyed through the inner bores to the cutting part of the tool can be increased. The service life and/or the cutting speed of the cutting tool are thus increased.

A blank is made available in a further embodiment according to the invention, wherein the blank is made of hard material or ceramic.

A blank is made available according to an exemplary embodiment of the invention, wherein the blank has a homogeneous structure, i.e. the blank is as if "from one casting". Despite an inner structure of the at least one inner bore that differs in sections, the blank does not have any fractures or irregularities or jointing points. A uniformly high loading capacity over the whole length of the blank is thus ensured, which increases the service life. Discontinuities, irregularities or edges at the wall of the inner bore are completely avoided or at least reduced. Without the aforementioned discontinuities, undesired eddies occurring especially in the case of oil/air mixtures are avoided at these points. In particular, the flow rate of oil/air mixtures that are conveyed, through the inner bore can thus be increased.

A blank is made available according to a further example of embodiment of the present invention, wherein the inner bore is suitable for conducting coolants and/or lubricants. The coolant and/or the lubricant can for example be drilling water and/or an oil/air mixture and/or a cooling lubricant and/or another suitable means for cooling and/or lubricating the tool.

A tool for the machining of a workpiece is made available according to a further exemplary embodiment of the present invention, wherein the tool comprises a blade, wherein the tool comprises a flute for conveying chips and/or coolant and/or lubricant, wherein the tool can be produced from a blank according to any one of claims 1 to 5.

An extrusion device is made available in a further embodiment according to the invention, wherein the control element is suitable for changing the twist angle, in particular the first and/or second twist angle, according to the position along the longitudinal axis of the blank.

The control element comprises a means for ascertaining the currently pressed position of the blank and can ascertain, by comparison with a preset nominal geometry of the inner bore, the formation that the inner bore is to continue to acquire. With the possibility of taking action on the extrusion device, the control element can ensure that the preset nominal geometry of the inner bore continues to be produced dimensionally accurately.

A method is made available according to an exemplary embodiment of the invention, wherein a third portion is pressed, in particular extruded, between the pressing, in particular extrusion, of the first portion and the pressing, in particular extrusion, of the second portion, wherein in the third portion the inner bore adjacent to the first portion has no twist, and adjacent to the second portion has a second twist with a second twist angle, wherein the second twist angle and the first twist angle are the same.

A method is made available according to a further exemplary embodiment of the present invention, wherein the twist angle in the third portion changes continuously along the longitudinal axis of the blank.

A method is made available according to a further embodiment according to the invention, wherein the blank comprises two or three inner bores.

A tool is made available in a further embodiment according to the invention, wherein the first region extends over a half, a whole, one and half times or two times the diameter of the tool, wherein the third region extends over a half, a whole, one and half, two times, two and a half times, three times, three and a half times, four times or four and a half times the diameter of the tool and wherein the second region occupies the remaining tool and/or wherein the first spiral angle has a number of degrees between 5° and 50°, in particular 30°, and/or wherein the second spiral angle has a number of degrees between 5° and 50°, in particular 15°.

A tool is made available according to a further example of embodiment of the present invention, wherein the tool comprises a coolant channel, wherein the coolant channel has a constant twist angle over the whole length of the tool or wherein the coolant channel has a constant twist angle over the whole length except in the region of the clamping shank and/or wherein the tool can be produced from a blank according to any one of claims 1 to 5.

A subject-matter of the invention can be regarded as making available a blank with a reduced flow resistance inside the inner bore by means of an inner bore run as rectilinearly as possible, wherein the inner bore is formed for the most part rectilinear at least in the first portion, i.e. usually the region subsequently used as the shank.

The individual features can of course also be combined with one another, as a result of which advantageous effects can in part also appear that go beyond that the sum total of the individual effects.

This and other aspects of the present invention are explained and illustrated by reference to the exemplary embodiments described below.

BRIEF DESCRIPTION OF THE DRAWINGS

Exemplary embodiments are described below by reference to the following drawings. In the figures:

FIG. 1 shows a blank with two inner bores in a longitudinal section,

FIG. 2 shows a blank with two inner bores in a cross-section,

FIG. 5 shows a blank, an extrusion device and a control,

FIG. 6 shows a tool with cooling channels,

DETAILED DESCRIPTION OF THE INVENTION

Figure 3:
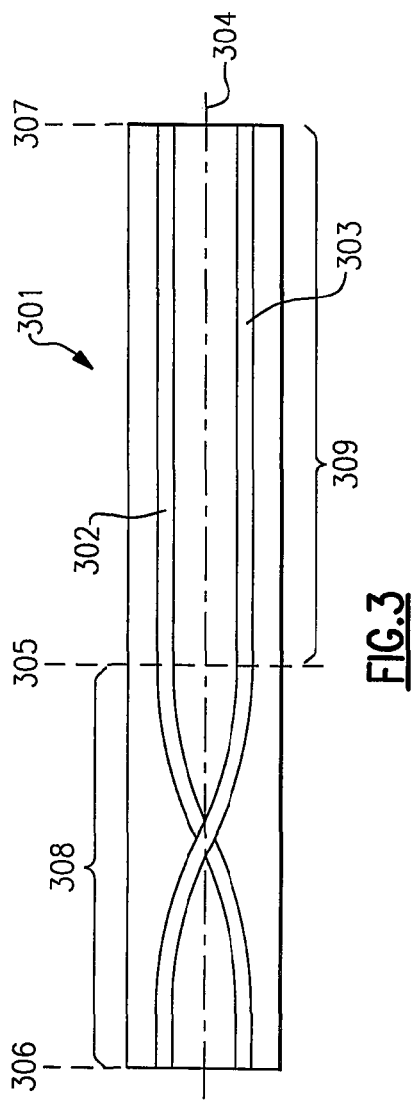
FIG. 3 shows a blank with two inner bores in a longitudinal section.

FIG. 1 shows a blank 101, also referred to as a preform, in a longitudinal section, wherein inner bores 102, 103 of blank 101 are represented diagrammatically. In a first portion 109, which extends from a parting line 105 up to a parting line 107, inner bores 102, 103 are formed rectilinear. Inner bores 102, 103 run in this portion 109 parallel to longitudinal axis 104 of blank 101. Inner bores 102, 103, which can also be referred to as cooling channels or simply as channels, run inside blank 101 and convey fluids from the shank to the cutting, working part of the finished drill which is produced from blank 101. Portion 109 represents the shank in the finished cutting tool, e.g. a drilling tool or milling cutter (e.g. thread milling cutter). The clamping chuck, drill chuck and drill can be accommodated on this shank. Around parting line 105 is a transition region inside blank 101. The inter-twisting of inner bores 102, 103 running non-rectilinearly and parallel to the longitudinal axis in first portion 109 begins in this portion. This transition region can theoretically be constituted as an area almost without width or as a third portion in which inner bores 102, 103 gradually twist into one another, wherein no twist is present adjacent to portion 109 and, in the direction towards portion 108, the twist has an increasing twist angle until the twist angle has a value which corresponds to the value of the twist angle of the twist of inner bores 102, 103 in portion 108. Over a certain length along the longitudinal axis of blank 101 in the transition region, inner bores 102, 103 can also have a constant twist angle or even an initially diminishing twist angle in the direction towards portion 108. Portion 108 begins at parting line 106 and can end at parting line 105, unless the third portion extends into second portion 108. In this case, a third portion arises in blank 101 beside the first and the second portion. Blank 101 comprises two inner bores 102, 103. The blank could however also comprise only one bore 102, 103 or three, four or more inner bores 102, 103. The dimensioning represents only an example of a specific embodiment, wherein inner bores 102, 103 in second portion 108 have here a twist with a twist angle of, in each case, 30 degrees. The twist angle could however also be 15 degrees, 20 degrees, 30 degrees, 40 degrees or another degree value in the range from degrees to 80 degrees, in particular 10 degrees to 45 degrees. The twist angle of inner bores 102, 103 can also differ from one another.

FIG. 2 shows a blank 101 in cross-section. Circle 201 represents the outer boundary of the blank. The two inner bores 202, 203 are located on circle 204. The dimensional data of FIG. 2 represent only a possible embodiment of the blank. The blank is represented in FIG. 2 enlarged fivefold (5:1).

FIG. 3 shows a blank 301 with a first portion 309 and a second portion 308. First portion 309 extends from one end 307 of blank 301 up to parting line 305. This first portion 309 represents the shank in the finished cutting tool, e.g. a drill or milling cutter. Second portion 308 extends from the other end 306 of blank 301 up to parting line 305. Inner bores 302, 303 run in the first portion rectilinearly and parallel to longitudinal axis 304 of blank 301. In second portion 308, which can extend from parting line 306, which represents the end of the blank, up to parting line 305, inner bores 302, 303 no longer run rectilinearly and parallel to longitudinal axis 304 of blank 301. In the second portion, the inner bores are twisted into one another, i.e. the inner bores are formed helically or spirally. This helical formation of inner bores 302, 303 is necessary in order to evade the flutes of the finished tool, in order that the inner bores are not interrupted along longitudinal axis 304 and do not come too close to the outer wall of the tool. The inner bores serve to convey coolant, lubricant, drilling water, cooling lubricant and/or an air/oil mixture to the front part of the cutting tool. In the case of a drill, the drill bit can be supplied with coolant through inner bores 302, 303. The coolant emerging from the inner bores is conveyed out via the flutes together with the occurring chips from the bore hole. Apart from coolant or lubricant, the inner bores can also convey an air/oil mixture (or oil/air mixture) to the front cutting part of the cutting tool, as a result of which minimum quantity lubrication is enabled. It is especially advantageous to provide the first portion with rectilinear inner bores 302, 303, because in this way the flow resistance of the conveyed fluid (coolant, lubricant, air/oil mixture, cooling lubricant, drilling water) can be reduced.

A lower flow resistance thus arises for the whole blank, as a result of which a higher flow rate of the fluid can be achieved inside the finished cutting tool. Better cooling, since it is at a higher rate, and more rapid removal of the chips is achieved via the flutes, as a result of which the service lives can be increased and/or the operating speed of the cutting tool, on account of the increase in the rotational speed of the tool, can be increased.

Figure 4:
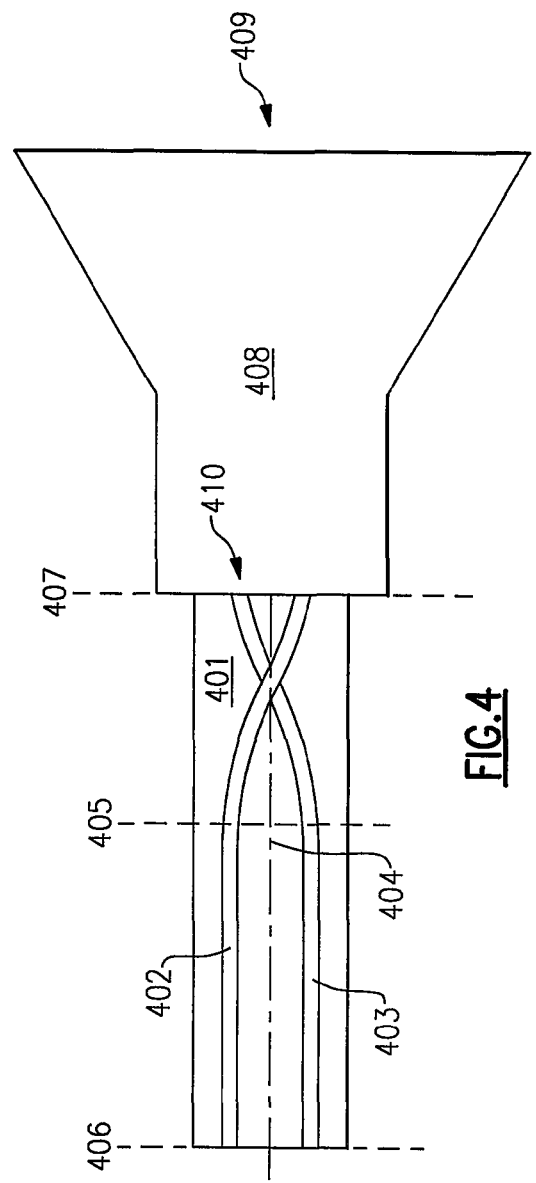
FIG. 4 shows a blank and an extrusion device.

FIG. 4 shows a blank 401 in a longitudinal section with two inner bores 402, 403, wherein in a first portion, which extends from parting line 406 up to parting line 405, inner bores 402, 403 are formed rectilinear and parallel to longitudinal axis 404. In a second portion, which extends from parting line 405 up to parting line 407, inner bores 402, 403 have a twist with a twist angle greater than zero. At parting line 405, the twist can start here initially with a smaller twist angle and, extending into the second portion, can have a twist with an increasing twist angle. The second portion comprises a sub-section, which extends from end 407 of blank 401 up to just short of parting line 405 and has an approximately constant twist angle of inner bores 402, 403. The region between the second portion, which comprises inner bore 402, 403 with a changing twist angle, can be referred to as the third portion beside the first and the second portion. Blank 401 is formed by the processing of an extrusion material with the aid of an extrusion device 408. Extrusion device 408 comprises an inlet 409, which receives the raw extrusion material, and an outlet 410, from which the blank is pressed, and more precisely extruded. Extrusion device 408 comprises elements for forming inner bores 402, 403 of blank 401, wherein extrusion device 408 is capable of providing inner bores 402, 403 along longitudinal axis 404 of the blank with different twists, i.e. with twists with different twist angles. Blanks 401 can thus arise, inner bore 402, 403 whereof has a twist, the twist angle whereof continuously changes or the twist angle whereof is constant over individual regions or the twist angle whereof in other regions has a value of approximately zero.

FIG. 5 shows a blank 501 with a first portion, which extends from parting line 506 up to parting line 505, wherein in this portion inner bores 502, 503 run rectilinearly and moreover parallel to longitudinal axis 504 of blank 501. It is also conceivable that inner bores 502, 503 do not run parallel to longitudinal axis 504 of blank 501, but do run rectilinearly. It is also conceivable that inner bores 502, 503 run neither parallel to longitudinal axis 504 nor rectilinearly, but are also not formed helically. A transition region can exist around parting line 505, in which inner bores 502, 503 transform into twisted inner bores 502, 503 of the second portion. This transition region can be regarded as the third portion. It is also conceivable that no transition region is present. In this case, rectilinear inner bores 502, 503 of the first portion transform directly into twisted inner bores 502, 503 of the second portion without a gradual twist adaptation taking place. In this case, the second portion extends from parting line 505 up to parting line 507. Blank 501 is produced by extrusion by means of an extrusion device 508. A raw material is introduced here into inlet 509 in the extrusion device and the blank is pressed out from outlet 510. The control of the twist, i.e. what twist angle the twist of inner bore 502, 503 should have at what position along longitudinal axis 504 of blank 501, takes place by means of control element 513. Control element 513 controls extrusion device 508 via a control path 512 and receives information concerning the current longitudinal position, i.e. the position of blank 501 along its longitudinal axis 504, via a signal path 511. Blanks 501 with an identical twist distribution of inner bores 502, 503 over their longitudinal axis 504 can be produced reproducibly by means of this control loop.

FIG. 6 shows a tool 601, e.g. a drill, with two inner bores (cooling channels) 602, 603, wherein the tool comprises a blade 611 and at least one flute 610. Flute 610 can end before the first portion, the shank, 609 or in the front region of shank 609, in order that the conveyed chips can be ejected before the region of shank 609 clamped in the tool chuck.

Figure 7:
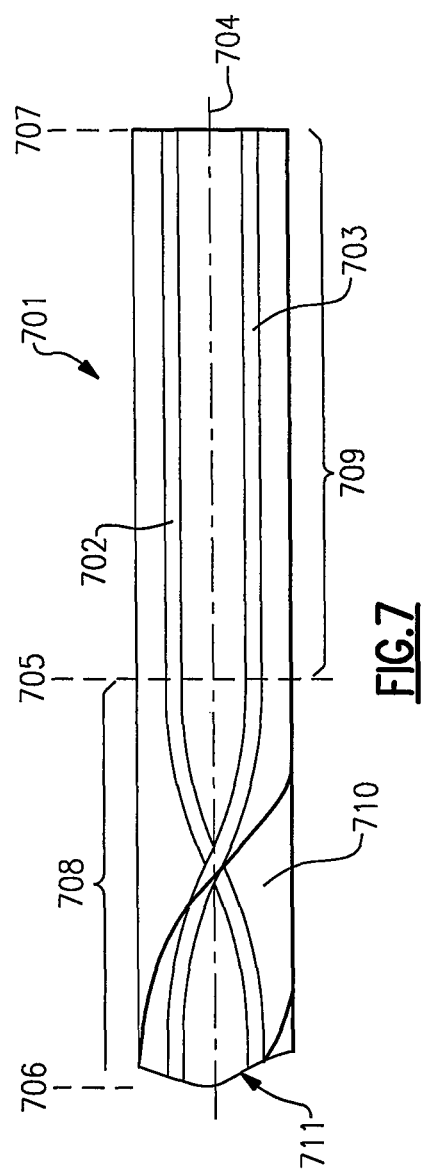
FIG. 7 shows a further tool with cooling channels.

FIG. 7 shows a tool 701, e.g. a drill, with a blade 711 and a flute 710.

The advantage of the invention is also to be seen in the fact that blanks can be produced with inner bores which can each have a twist with different twist angles, and moreover in a straightforward manner by extrusion. In particular, the production operation does not have to be interrupted in order for example to fit together sections with different twist angles. This thus leads to higher productivity. Furthermore, the use of solder to produce a solder joint or soldered joint is avoided, as a result of which an additional work step can be dispensed with, which leads to speeding-up of the production process, or a required welding operation is dispensed with.

The production of a cutting tool, e.g. drill, milling cutter, in particular thread milling cutter, requires helical inner bores, since the inner bores must not run into the flutes. Otherwise, the inner bores would be interrupted and the fluids to be conveyed, in particular coolant, lubricant, oil and/or air, would not get to the, in particular, cutting regions of the cutting tool. The helical formation of the inner bores is also necessary in order that the outer walls do not become too thin in the cutting part of the tool, which would lead to the service life being dramatically reduced. A drawback, however, is that the flow resistance is increased on account of the helical formation of the inner bores. The invention advantageously comprises inner bores that run rectilinearly in the shank, as a result of which the flow resistance proves to be much less than in the case of inner bores which have a helical formation of the inner bores over the whole length of the cutting tool, i.e. also in the shank region.

The invention enables here the production of blanks comprising one piece which have advantageous flow characteristics, without a plurality of parts having to be fitted together, e.g. parts with helical inner bores and parts with rectilinear inner bores. A shorter production time of the blanks is thus enabled. Moreover, the blanks thus have a homogeneous structure, which leads to a higher loading capacity of the produced cutting tools, as a result of which a longer service life and/or higher path feed rate can be achieved.

On account of the inventive production of the blanks "from one casting", there is no need for the flush matching of the inner bores of parts to be fitted together. A time-consuming and labour-intensive production process is thus avoided as a result.

Reproducible blanks with identical geometries of the inner bores can be produced by means of the control element according to the invention. The reject rate is thus reduced.

Figure 8:
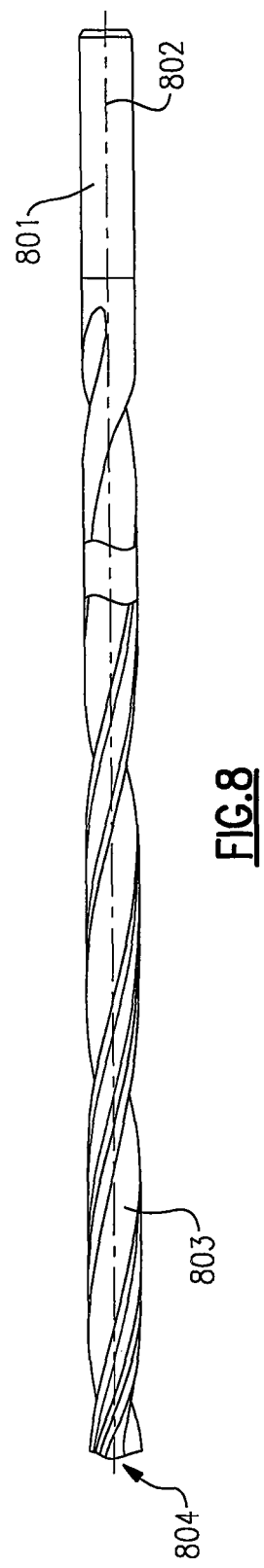
FIG. 8 shows a tool according to the invention.

FIG. 8 shows a tool according to the invention with a first portion or region with a first spiral angle or spiral pitch progression of one or more flutes 803, wherein the spiral angle can be formed constant in the first region. The tool comprises a third portion with a changing spiral angle and a second portion with a second spiral angle of the flute or the flutes, wherein the second spiral angle can be formed constant over the length of the second portion. In an exemplary embodiment of the invention, the first spiral angle can have a number of degrees between 5° and 50°, in particular 30°, the spiral angle in the third portion can diminish continuously, in particular from 30° to 15°, and the second spiral angle can have a constant value in the range between 5° and 50°, in particular 15°. In a further embodiment, the first portion can extend over a length of a half, a whole, one and half times, two times, two and a half times, three times, three and a half times, four times or four and a half times the diameter of the tool, the third portion over a length of a half, a whole, one and half times, two times, two and a half times, three times, three and a half times, four times or four and a half times the diameter of the tool and the second portion occupies the remaining region of the tool. In a further embodiment, the tool can comprise one or more coolant channels, wherein these coolant channels can have a constant twist angle over the whole length of the tool. In a further alternative embodiment, the tool can comprise one or more coolant channels which, in the region of clamping shank 801, have a constant twist angle, e.g. 0°, and in the remaining region of the tool another constant twist angle, e.g. 15°. In an alternative embodiment, the tool according to the invention can comprise only a first portion and a second portion and no third portion. With this variant, therefore, the tool according to the invention has an abrupt transition, i.e. not a gradual transition, of the first spiral angle to the second spiral angle.

Figure 9:
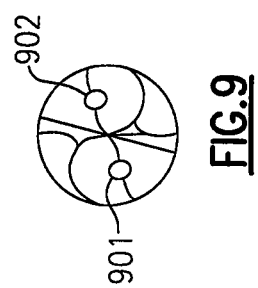
FIG. 9 shows an end face of a tool according to the invention.

FIG. 9 shows an end face of a tool according to the invention with two outlet openings 901, 902 of two coolant channels. Alternatively, the tool according to the invention can comprise only one coolant channel or arbitrarily many coolant channels.

Figure 10:
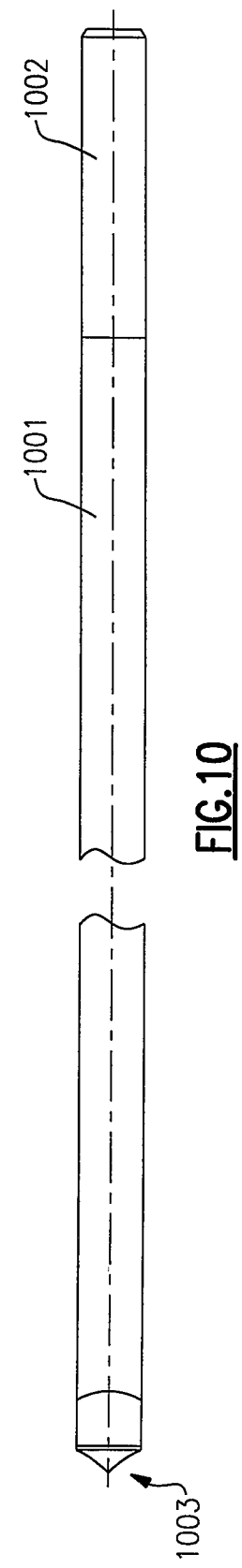
FIG. 10 shows a blank for producing a tool according to the invention.

FIG. 10 shows a blank for producing a tool according to the invention with a region 1002, which can be provided as a clamping shank, and a tip 1003, which can be formed into a tool bit.

It should be noted that the term "comprise" does not exclude further elements or process steps, just as the term "a" or "an" does not exclude a plurality of elements or steps.

The employed reference numbers serve merely to increase comprehensibility and should under no circumstances be regarded as limiting, the scope of protection of the invention being reproduced by the claims.

List Of Reference Numbers 101 blank,
102 inner bore, 103 inner bore,
104 longitudinal axis,
105 parting line,
106 parting line,
107 parting line,
108 second portion,
109 first portion,
201 blank,
202 inner bore,
203 inner bore,
301 blank,
302 inner bore,
303 inner bore,
304 longitudinal axis,
305 parting line,
306 parting line,
307 parting line,
308 second portion,
309 first portion,
401 blank,
402 inner bore,
403 inner bore,
404 longitudinal axis,
405 parting line,
406 parting line,
407 parting line,
408 extrusion device,
409 inlet,
410 outlet,
501 blank,
502 inner bore,
503 inner bore,
504 longitudinal axis,
505 parting line,
506 parting line,
507 parting line,
508 extrusion device,
509 inlet,
510 outlet,
511 signal path,
512 control path,
513 control element
601 tool
602 cooling channel,
603 cooling channel,
604 longitudinal axis,
605 parting line,
606 parting line,
607 parting line,
608 second portion,
609 first portion,
610 flute,
611 blade,
701 tool,
702 cooling channel,
703 cooling channel,
704 longitudinal axis,
705 parting line,
706 parting line,
707 parting line,
708 second portion,
709 first portion,
710 flute,
711 blade,
801 clamping shank,
802 centre line
803 flute,
804 tool bit,
901 outlet opening coolant channel,
902 outlet opening coolant channel,
1001 centre line
1002 clamping shank,
1003 tool bit.

The invention claimed is:

1. A blank for producing a cutting tool, the blank comprising:
at least two inner bores for conducting fluids;
a substantially continuous outer diameter; and
at least a first portion, a second portion, and a third portion along a longitudinal axis of the blank,
the inner bores in the first portion each being formed substantially rectilinear and parallel to the longitudinal axis of the blank,
the inner bores in the second portion each having a first twist with a first twist angle greater than zero, and
the first twist angle of at least one of the inner bores differing from the first twist angle of at least one other of the inner bores,
the blank obtained by a continuous pressing operation wherein the third portion is between the first portion and the second portion,
wherein in the third portion each inner bore:
adjacent to the first portion has no twist, and
adjacent to the second portion has a second twist with a second twist angle, wherein the second twist angle and the first twist angle are the same, wherein in the third portion the inner bore has a twist with a twist angle which changes continuously along the longitudinal axis of the blank.

2. The blank according to claim 1, wherein the first portion comprises approximately half of the blank and/or wherein the first twist angle has a value between 10 and 45 degrees.

3. The blank according to claim 2, wherein the first twist angle has a value of 15, 20, 30 or 40 degrees.

4. The blank according to claim 1, wherein the blank comprises two or three inner bores.

5. The blank according to claim 1, wherein the blank is made of hard metal or ceramic.

6. The blank according to claim 1, wherein the blank has a homogeneous structure and/or wherein the inner bore is suitable for conducting coolant and/or lubricant.

7. A tool for the machining of a workpiece, wherein the tool comprises a blade, wherein the tool comprises a flute for conveying chips and/or coolant and/or lubricant, wherein the tool can be produced from a blank according to claim 1.

8. An extrusion device for producing a blank according to claim 1, wherein the extrusion device comprises a control element for controlling at least one of the first twist angle and the second twist angle.

9. The extrusion device according to claim 8, wherein the control element is suitable for changing at least one of the first twist angle and the second twist angle according to the position along the longitudinal axis of the blank.

10. A method for producing a blank according to claim 1, comprising the steps
pressing a first portion of the blank, in which the inner bore is formed substantially rectilinear and parallel to the longitudinal axis of the blank,
pressing a second portion of the blank, in which the inner bore is formed with a first twist and a first twist angle with a value greater than zero.

11. The method according to claim 10, wherein a third portion is pressed between the pressing of the first portion and the pressing of the second portion, wherein in the third portion the inner bore
- adjacent to the first portion has no twist, and
- adjacent to the second portion has a second twist with a second twist angle, wherein the second twist angle and the first twist angle are the same.

12. The method according to claim 11, wherein the twist angle in the third portion continuously changes along the longitudinal axis of the blank.

13. The method according to claim 11, wherein said pressing a first portion of the blank comprises extruding the first portion of the blank, and said pressing a second portion of the blank comprises extruding the second portion of the blank.

14. The method according to claim 11, wherein said third portion is extruded between the pressing of the first portion and the pressing of the second portion.

15. The method according to claim 10, wherein the blank comprises two or three inner bores.

16. The blank according to claim 1, wherein the continuous pressing operation is an extruding operation.

\* \* \* \* \*